United States Patent
Yamamoto

(10) Patent No.: US 6,507,571 B1
(45) Date of Patent: Jan. 14, 2003

(54) RECEIVING APPARATUS AND RECEIVING METHOD

(75) Inventor: Katsuya Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/108,342

(22) Filed: Jun. 30, 1998

(30) Foreign Application Priority Data

Jul. 2, 1997 (JP) .......................................... P09-177020

(51) Int. Cl.[7] .............................. H04J 3/06; G08C 17/00
(52) U.S. Cl. ....................... 370/335; 370/503; 370/509; 370/350
(58) Field of Search ................................ 370/355, 320, 370/335, 342, 441, 503, 509, 514, 516, 517–18, 350; 455/442; 375/200, 140, 149

(56) References Cited

U.S. PATENT DOCUMENTS

| | | | | |
|---|---|---|---|---|
| 5,790,589 A | * | 8/1998 | Hutchison, IV et al. | .... 375/200 |
| 5,872,774 A | * | 2/1999 | Wheatley, III et al. | ..... 370/335 |
| 6,151,502 A | * | 11/2000 | Padovani et al. | ........... 455/442 |
| 6,229,792 B1 | * | 5/2001 | Anderson | .................... 370/280 |

* cited by examiner

*Primary Examiner*—Chau Nguyen
*Assistant Examiner*—Ron Abelson
(74) *Attorney, Agent, or Firm*—Jay H. Maioli

(57) ABSTRACT

A receiving apparatus is used in a mobile communication system transmits and receives spread spectrum signals between a base station and a mobile station, in which the timing detection region of a spread spectrum signal is set in accordance with the intermittent receiving period. If it is difficult for the mobile station to establish synchronization with the base station over a long intermittent receiving period due to errors accumulated in the oscillator of the mobile station, the window serving as the search area is expanded. Accordingly, the capability of detecting the timing is increased, and errors of the oscillator are compensated. Thus a, re-synchronizing operation and intermittent receiving operation are reliably performed. As a consequence, even by the use of a low-precision and simple-structured oscillator in the mobile station, a low-powered receiving apparatus in which an intermittent receiving operation having a longer period is provided.

4 Claims, 4 Drawing Sheets

RECEIVING APPARATUS AND RECEIVING METHOD

BACKGROUND OF THE INVENTION

1. Field of the Invention

The present invention generally relates to a receiving apparatus and a receiving method in which a receiving operation is intermittently performed. More particularly, the invention relates to a receiving apparatus suitably used in a mobile communication system which performs communications according to, for example, a code division multiple access method. The invention is also concerned with a receiving method for use in the above type of receiving apparatus.

2. Description of the Related Art

Hitherto, in performing communications by sharing a single base station among a plurality of mobile stations, a communication method, such as frequency division multiple access, time division multiple access, or code division multiple access, is employed in order to avoid interference between the communication lines of the individual mobile stations. Each of the above methods has advantages and disadvantages and is thus selected according to the intended purpose of the use of the communication system.

For example, in the code division multiple access (hereinafter referred to as "CDMA") method, a modulated wave of the same carrier frequency is spread into a wider band than the original band by utilizing a specific code (hereinafter referred to as "Pseudo-random Noise sequence (PN) code") assigned to each line. The above frequency spread is referred to as the "spread spectrum technique". Then, the respective modulated waves processed by the spread spectrum technique are multiplexed and then transmitted. On the receiving side, the received spread spectrum signal is synchronized with the same PN code as that of the transmitting side which is supplied via a predetermined line. Thus, only a desired line can be identified.

In the spread spectrum technique, the same PN code as that of the transmitting side with respect to the phase of a receiving signal as well as its pattern, is required for despreading the signal. Thus, multiple access is made possible by changing the pattern or the phase of the PN code. In this manner, multiple access is implemented by varying the pattern or the phase of the code sequence of the spread spectrum signal. This is referred to as the CDMA method.

In the CDMA method, different PN signals are first assigned to the respective lines. The transmitting side multiplies the respective modulated waves to be transmitted via the individual lines by the different PN codes, thereby performing spread spectrum. It should be noted that the individual waves have been modulated in a predetermined manner prior to spread spectrum processing. The modulated waves processed by the spread spectrum technique are then multiplexed and transmitted.

The receiving side multiplies the receiving signal transmitted from the transmitting side by the same PN code as that assigned to the predetermined line while synchronizing the signal with the PN code. This makes it possible to demodulate the modulated wave transmitted only through a desired line.

In this manner, according to the CDMA method, communications can be directly established between the transmitting side and the receiving side if the same code is set on both sides. Moreover, in the CDMA method, spread spectrum is performed, as discussed above, on the modulated waves by using the different PN codes assigned to the individual lines. This allows the receiving side to demodulate the spread spectrum signal transmitted only via a predetermined line, and additionally, PN codes are pseudo random sequence codes, thereby ensuring communication privacy.

Further, in the mobile communication system using the CDMA method, the base station on the transmitting side repeatedly transmits a PN code for allowing a mobile station to establish and maintain synchronization and to reproduce the clock. The PN code, which is repeatedly transmitted from the transmitting side, is referred to as "a pilot signal". The mobile station on the receiving side then detects the respective pilot signals transmitted from a plurality of base stations and allocates the detected timings to the respective demodulators. It should be noted that a PN code is generated within the demodulators of the mobile station. Each demodulator then multiplies at an allocated timing the spread spectrum signal transmitted from a desired base station by the PN code, thereby demodulating the receiving signal.

Namely, in the mobile communication system using the CDMA method, the respective base stations transmit PN codes having different timings as pilot signals. In response to the transmitted pilot signals, the mobile station detects the timing of the pilot signal supplied from a desired base station and synchronizes the PN code generated in the demodulator of the mobile station with the detected timing. As a consequence, the spread spectrum signal transmitted only from a desired base station can be correctly demodulated.

Although the individual base stations respectively transmit the PN codes having different timings, as discussed above, all the PN codes have the same code pattern. A timing difference between the pilot signals transmitted from the respective base stations appears to be a difference between the PN codes.

In the mobile station, while being in the standby position, an intermittent receiving operation may be performed to save power. In the mobile communication system using the CDMA method, the intermittent receiving operation is performed in the following manner. Prior to the start of a receiving zone, pilot signals are obtained to re-establish synchronization with the respective base stations. The detected timings are then assigned to the respective demodulators. Upon completing the receiving zone, the mobile station interrupts the receiving operation, thus losing synchronization with the base stations. Thus, signals can be intermittently received by the mobile station by repeating the above-described operation. With a longer period of the intermittent receiving zone (in other words, if a non-receiving zone is longer), more effective power conservation is expected.

However, the above-described intermittent receiving operation presents the following problems. In the CDMA mobile station, with a longer period of the intermittent receiving zone (if the non-receiving zone is longer), errors made by the oscillator within the mobile station are accumulated, thereby increasing the possibility of failing to establish synchronization with the pilot signal (i.e., failing to detect the timing) prior to the intermittent receiving operation. Namely, the intermittent receiving operation cannot be accurately performed.

The aforementioned problem may be solved by using a high-precision oscillator. This, however, increases the cost of the mobile station, which serves as a receiving apparatus.

On the other hand, without using a high-precision oscillator, it is very difficult for the mobile station to perform the intermittent receiving operation having a longer period. It is thus hard to obtain a low-powered receiving apparatus.

SUMMARY OF THE INVENTION

Accordingly, in order to solve the foregoing problems, it is an object of the present invention to provide a low-powered receiving apparatus in which an intermittent receiving operation having a longer period can be performed in a mobile station even by the use of a low-precision and simple-structured oscillator, and also to provide a receiving method for use in the above type of receiving apparatus.

To achieve the above object, according to one aspect of the present invention, there is provided a receiving apparatus for use in a mobile communication system which transmits and receives spread spectrum signals between a base station and a mobile station according to a code division multiple access technique. The receiving apparatus includes timing detection means for detecting, in re-synchronizing with the mobile communication system, a timing of a pilot signal transmitted from the base station by using the pilot signal and a spread spectrum signal generated corresponding to the pilot signal. Intermittent receiving means performs an intermittent receiving operation based on the timing detected by the timing detection means. Control means sets, in accordance with an intermittent receiving period set in the intermittent receiving means, a region of the spread spectrum signal within which the timing is detected by the timing detection means.

According to another aspect of the present invention, there is provided a receiving method for use in the above type of receiving apparatus. The receiving method includes the steps of detecting, in re-synchronizing with the mobile communication system, a timing of a pilot signal transmitted from the base station by using the pilot signal and a spread spectrum signal generated corresponding to the pilot signal, and of performing an intermittent receiving operation based on the timing detected in the detection step, the timing being detected by setting a timing detection region in accordance with an intermittent receiving period of the intermittent receiving operation.

Errors of the oscillator are accumulated over a long intermittent receiving period, which may fail to establish synchronization. Thus, the precision of the timing detecting operation, for example, the detection capability used as the search area, is set according to the intermittent receiving period, thereby compensating for errors of the oscillator of the mobile station. As a result, a low-powered intermittent receiving operation can be performed even over a long intermittent receiving period.

DESCRIPTION OF THE PREFERRED EMBODIMENT

An embodiment of the present invention is described in detail below with reference to the drawings. In this embodiment, the intermittent receiving operation performed in the IS-95 method, which is a standardized method of the CDMA communication system in the United States, is discussed.

Figure 1:
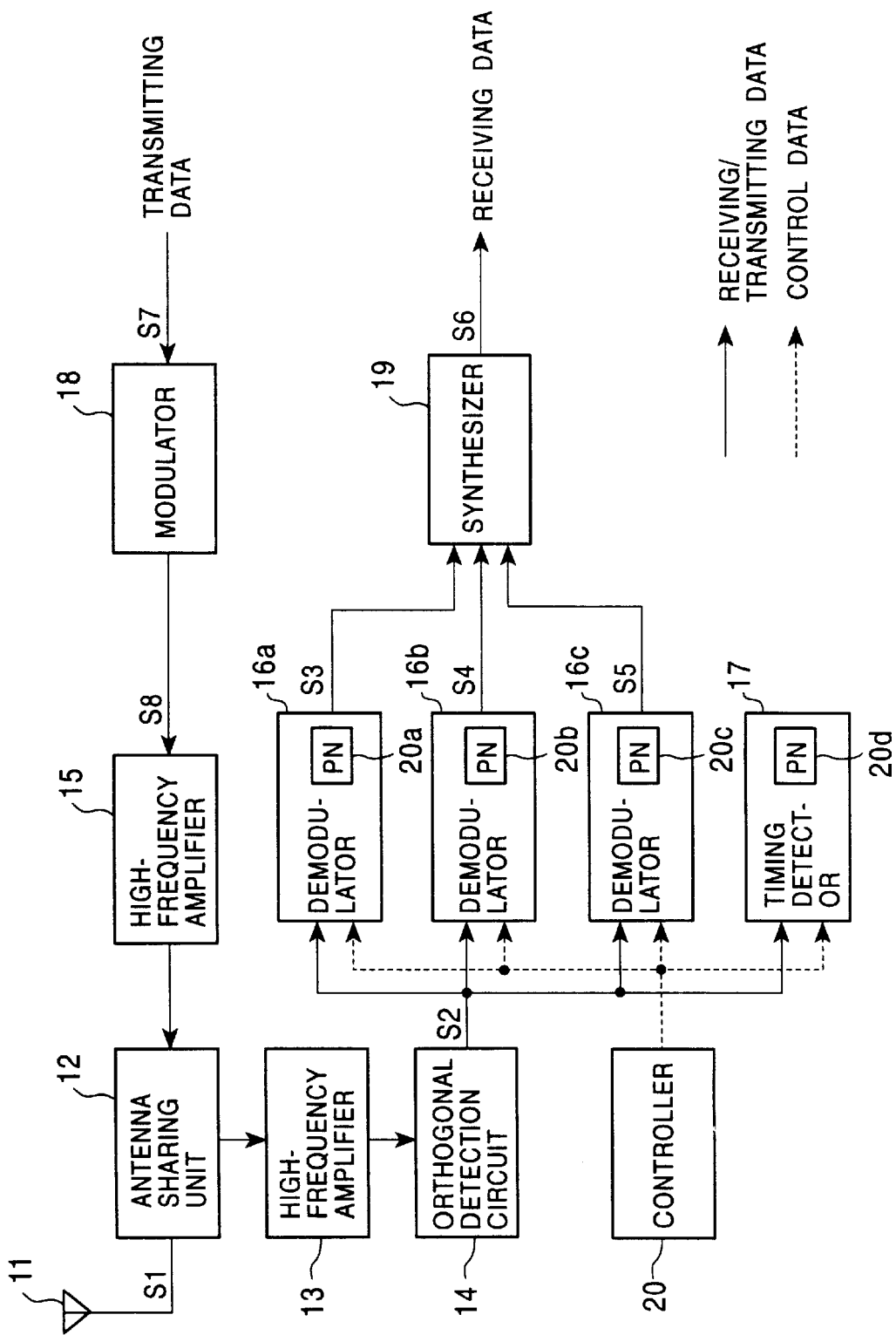
FIG. 1 is a block diagram illustrating the essential portion of a receiving apparatus according to an embodiment of the present invention.

FIG. 1 illustrates a mobile-station receiving apparatus using the intermittent receiving method according to an embodiment of the present invention. In the mobile-station receiving apparatus, a signal S1 received via an antenna 11 is converted into a baseband signal S2 by being sequentially processed in an antenna sharing unit 12, a high-frequency amplifier 13, and an orthogonal detection circuit 14. The analog baseband signal S2 is then converted into a digital signal in an analog-to-digital (A/D) converter (not shown), and is further supplied to a plurality of demodulators 16a, 16b, and 16c and a timing detector 17.

The timing detector 17 detects from the baseband signal S2 the pilot signals transmitted from the base stations. To perform the detecting operation, the timing detector 17 generates a PN code in a built-in PN generator 20d. The timing detector 17 also assigns the timings detected based on the pilot signals to the demodulators 16a, 16b, and 16c via a controller 20. The demodulators 16a, 16b, and 16c respectively demodulate the baseband signal S2 at the assigned timings so as to obtain demodulated signals S3, S4, and S5, which are then supplied to a synthesizer 19. More specifically, demodulation is performed in the following manner. The demodulators 16a, 16b, and 16c respectively generate PN codes within built-in PN generators 20a, 20b, and 20c, and multiply the baseband signal S2 by the generated PN codes at the above-described timings.

Each base station transmits a PN code at a timing inherent in its own station. Accordingly, the timing presented by the pilot signal is synchronized with the PN code generated in the demodulator, and the baseband signal S2 is demodulated by using the synchronized PN code. This makes it possible to selectively demodulate the signals transmitted only from a predetermined base station. Synchronizing the timing presented' by the pilot signal with that of the PN code generated in the demodulator is referred to as "locking".

As noted above, the demodulators 16a, 16b, and 16c demodulate the supplied baseband signal S2 by using the different PN codes. This is because of the following reason. Signals transmitted from base stations do not always pass through transmission channels of a fixed propagation length. Instead, some signals pass through transmission channels of different path lengths by reflecting from obstacles, such as buildings, and are then received by a receiving apparatus. A plurality of reflection waves received via a plurality of transmission channels are referred to as "multipath" transmission. Due to multipath transmission, a plurality of demodulators 16a, 16b, and 16c are required in the receiving apparatus, which is operable according to the number of paths or the number of receivable base stations. In the mobile-station receiving apparatus illustrated in FIG. 1, the signal S1 received via transmission channels of three different paths (namely, received at three different timings) is demodulated by the respective demodulators 16a, 16b, and 16c.

The synthesizer 19 inputs and synthesizes the demodulated signals S3, S4, and S5 obtained through multipath transmission. Prior to synthesizing, since the signals S3, S4, and S5 have been demodulated at the different timings, the synthesizer 19 synchronizes the timings of the demodulated signals S3, S4, and S5 with each other. As a consequence, the synthesizer 19 generates receiving data S6 having a high signal-to-noise ratio and a high signal-to-interference ratio and outputs it to the subsequent stage of a circuit system.

Further, in addition to the receiving circuit, the mobile-station receiving apparatus shown in FIG. 1 has a transmitting circuit. Transmitting data S7 is supplied to a modulator 18 in which spread spectrum and offset Quadrature Phase Shift Keying (QPSK) processing are executed on the data S7 to produce a modulated signal S8. The modulated signal S8 is then amplified in a high-frequency amplifier 15 and is radiated after sequentially passing through the antenna sharing unit 12 and the antenna 11.

Figure 2:
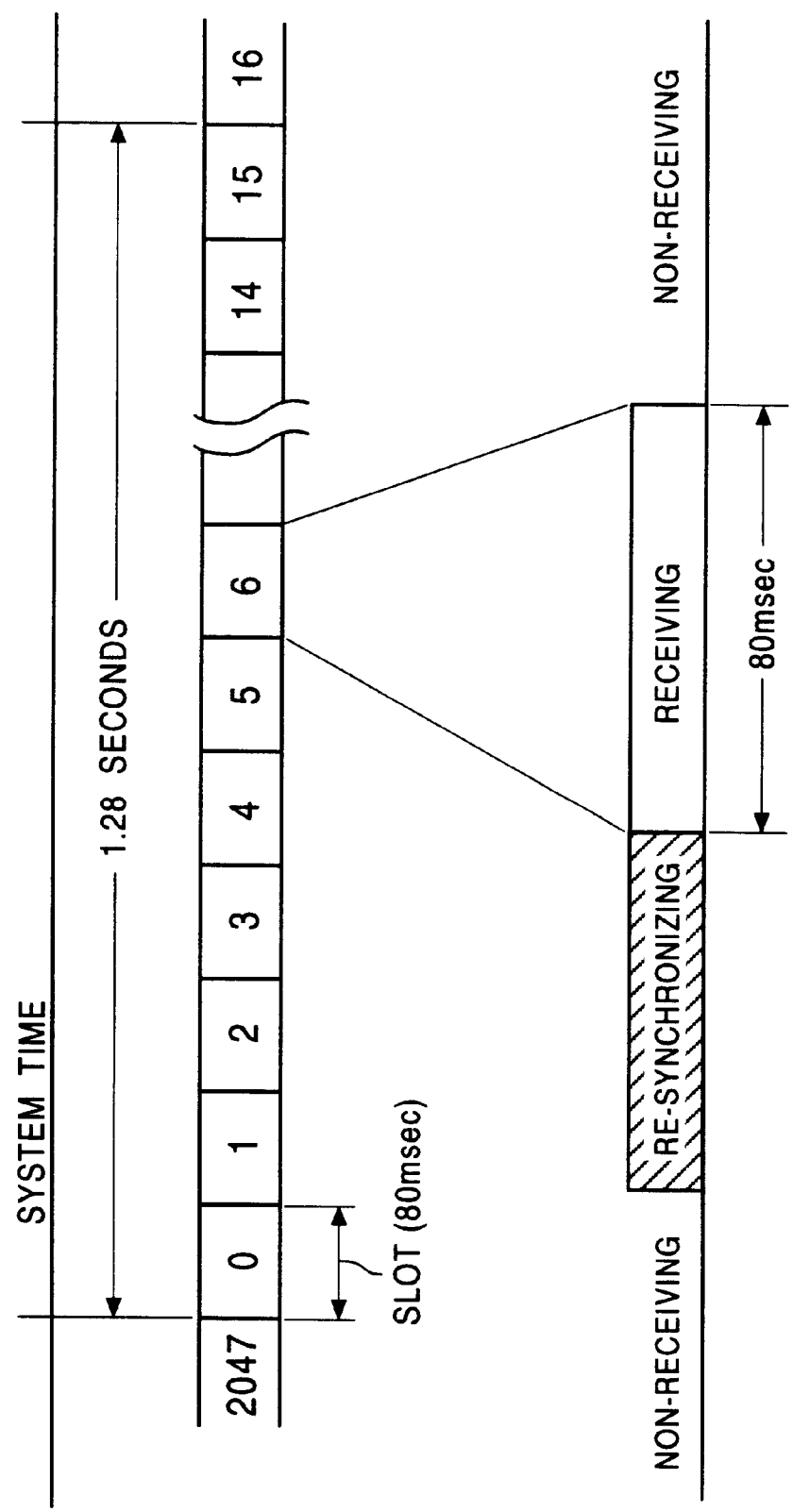
FIG. 2 illustrates the intermittent receiving operation performed by the receiving apparatus shown in FIG. 1.

The intermittent receiving operation performed by the mobile-station receiving apparatus is schematically shown in FIG. 2. Upon establishing initial synchronization with the base station by supplying power, a system time, which is time information used in the CDMA system, is obtained. The system time is maintained and updated both in the mobile station and the base station. The start timing and the end timing of the intermittent receiving operation performed by the mobile station are determined based on the system time. More specifically, the receiving time is divided into slots (paging channel slots) in units of 80 msec, and the mobile station receives only the assigned slot. The period T of the intermittent receiving operation in units of 1.28 seconds is determined by the following equation.

$$T = 1.28 \times 2^i (i=0, 1, \ldots 7)$$

Thus, the shortest intermittent period is 1.28 seconds (equal to 16 slots), and the longest intermittent period is 163.84 seconds (equal to 2048 slots).

FIG. 2 is an example of the intermittent receiving operation having the shortest intermittent period, i.e., 1.28 seconds, and slot number 6 is assigned to this mobile station. The subsequent receiving slot assigned to the mobile station is 22 (=6+16). For assessing the intermittent period and the assigned slot number in the mobile station, it is necessary to receive the control message transmitted from the base station and to analyze it. Such an intermittent-period assessment means is implemented by the demodulators 16a, 16b, and 16c and receiving control software (i.e., the function of the controller 20).

In the intermittent receiving operation performed in slot number 6 indicated by the lower portion of FIG. 2, in order to properly receive the receiving slot zone assigned to the mobile station, the mobile station should be re-sychronized with the CDMA system prior to the receiving slot. This re-synchronizing operation is indicated by the hatched portion in the lower portion of FIG. 2. The re-synchronized operation is performed by the timing detector 17 and the controller 20.

The re-synchronizing operation can be performed, for example, by the following procedure.

1. detecting the timing of the previously received pilot signal (performing partial searching operation); and
2. assigning a new timing to the demodulator by utilizing the detected timing of the previous pilot signal.

The above-described partial searching operation is more specifically discussed with reference to FIG. 3. As has been discussed in the description of the related art, according to the CDMA method, the base station repeatedly transmits a PN code, which is referred to as the pilot signal. In the IS-95 method, the length (the period) of the PN code is $2^{15}$ (=32768 chips). The chip indicates the unit of codes "0" and "1" representing information bits which are spread by the spread spectrum technique. In this case, the code ("0" and "1") generation pattern is repeated with a $2^{15}$ (=32768 chips) period.

In the mobile station, the same PN code pattern as that generated by the base station is produced to establish correlation with the PN code pattern which is currently being received, thereby detecting the timing of the PN code. More specifically, the timing detector 17 of the mobile station shifts, as shown in FIG. 3, the PN code generation timing provided in the PN code generator 20d within the search area (timing area) set as the window W, thereby repeatedly correlating the above PN code with the receiving PN code indicated by the upper portion of FIG. 3.

However, it takes time for the mobile station to check correlation of the PN code for a whole period (32768 chips). Normally, therefore, correlation with respect to only part of the PN code is checked. The number of chips to be partially correlated is referred to as "the number of chips to be multiplied". A greater number of chips to be multiplied requires more time to detect the timing of the pilot signal, but on the other hand, the timing can be detected with higher precision. Conversely, a smaller number of chips to be multiplied requires less time to detect the timing of the pilot signal, but the precision of detecting the timing is decreased.

Figure 3:
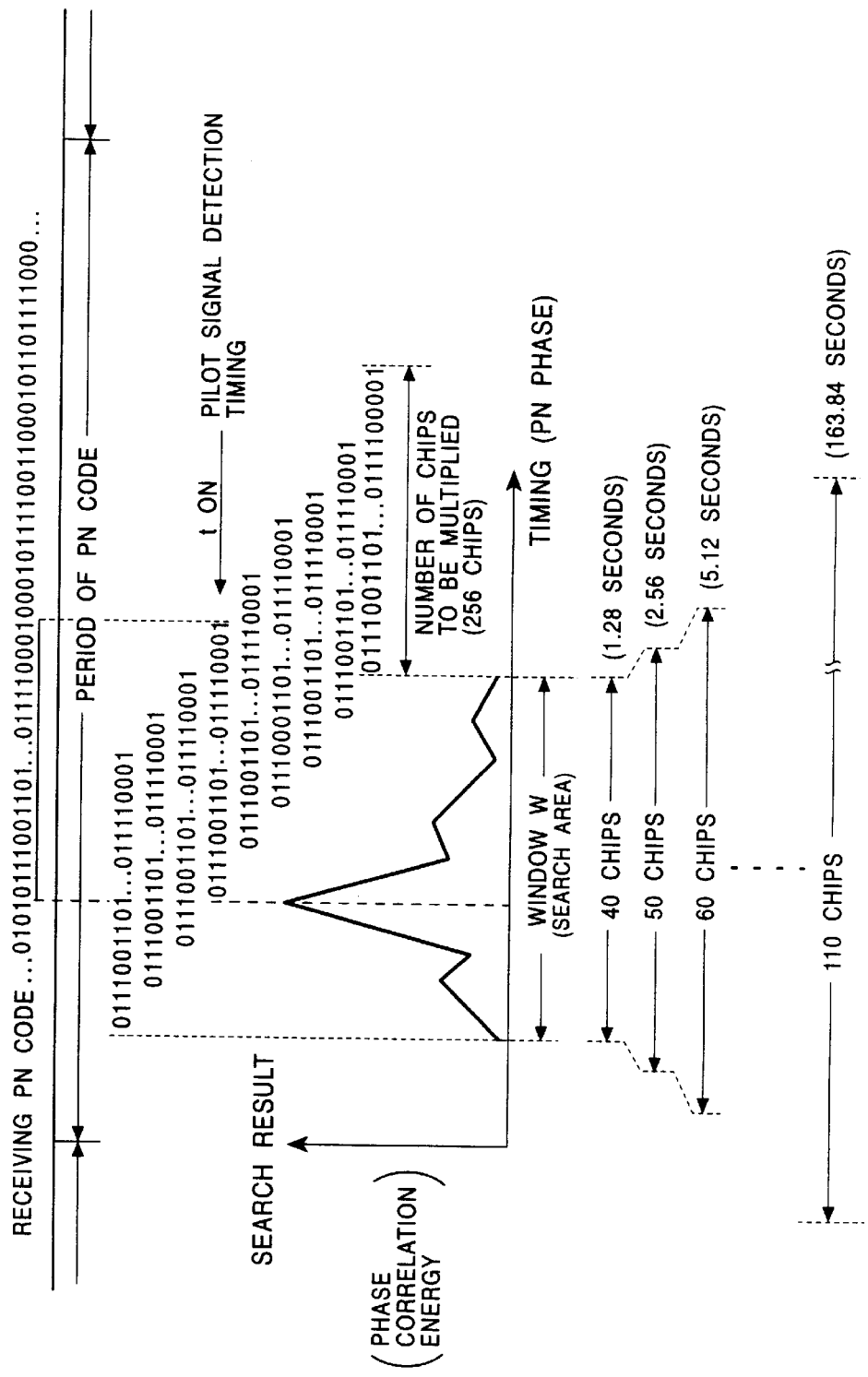
FIG. 3 illustrates the pilot-signal detecting operation performed by the receiving apparatus shown in FIG. 1.

In the detecting operation illustrated in FIG. 3, when the intermittent receiving period is 1.28 seconds, the number of chips to be multiplied is set to be 256, and the search area containing 40 chips, which serves as the window W, is set. At the lower portion of FIG. 3, as the search result within the window W, the phase correlation energy is represented on the vertical axis. The phase correlation energy is determined as follows. Energy "1" is added when a given chip of the generated PN code coincides with the corresponding chip at the same timing of the received PN code (for example, "1" and "1" or "0" and "0"). Thus, at the timing tON at which the generated PN code and the received PN code are in phase, the phase correlation energy becomes maximum. The timing tON is used as the pilot signal timing detected as the result of the partial searching operation.

Based on the pilot signal timing detected by the timing detector 17, the controller 20 assigns new timings to the demodulators 16a, 16b, and 16c, as stated in procedure 2 of the above-described re-synchronizing operation.

As discussed in the description of the related art, while synchronization is being lost between the mobile station and the base station in the non-receiving zone of the intermittent receiving operation, the pilot signal timing which was previously received and recorded within the mobile station deviates from the actual current timing in response to the length of the non-receiving zone. This deviation is due to errors made by the oscillator within the mobile station. If such a deviation of the pilot signal timing is not contained within the window W as the partial search area shown in FIG. 3, re-synchronization with the CDMA system cannot be established. As a consequence, the slot assigned to the mobile station cannot be correctly received.

Accordingly, in the mobile-station receiving apparatus of this embodiment, the controller 20 first judges the intermittent period of the intermittent receiving operation. In accordance with the obtained intermittent period, the controller 20 variously sets the above-described partial search area of the window W used for detecting the timing by the timing detector 17, thereby determining the timing detection region. Thus, the pilot signal is reliably detected by the timing detector 17.

More specifically, when a longer intermittent period is set, the search area as the search window W is expanded, thereby increasing the detection precision. As a consequence, the pilot signal is reliably detected even during a longer intermittent receiving operation in which errors of the oscillator are increasingly accumulated.

As discussed above, there are eight values of period T of the intermittent receiving operation, as expressed by $T=1.28\times 2^i$ (i=0, 1, ... 7). A variation in the period T as the intermittent receiving period with respect to the partial searching area and the number of chips to be multiplied is shown in Table 1.

TABLE 1

| Intermittent receiving period (second) | Partial searching area (W) (chip) | Number of chips to be multiplied |
| --- | --- | --- |
| 1.28 | 40 | 256 |
| 2.56 | 50 | 256 |
| 5.12 | 60 | 256 |
| 10.24 | 70 | 256 |
| 20.48 | 80 | 128 |
| 40.96 | 90 | 128 |
| 81.92 | 100 | 128 |
| 163.84 | 110 | 128 |

The intermittent receiving period may be selected by the user according to the effect of power saving or the intended purpose of use, or may be fixed by the manufacturer before shipping. Alternatively, the intermittent receiving period may be variously and automatically changed by the controller 20 according to the condition of the received radio wave or the frequency of occurrence of communications.

In whichever manner the intermittent receiving period is determined, one of the above intermittent periods is set in the intermittent receiving operation. In the mobile-station receiving apparatus of this embodiment, the timing detection region is changed in accordance with the intermittent receiving period. More specifically, as discussed above, the information concerning the search area as the window W used in the timing detector 17 and the information concerning the number of chips to be multiplied during the searching operation are determined by the controller 20. The controller 20 determines the area of the window W and the number of chips to be multiplied according to the intermittent receiving period, as shown in Table 1.

For example, when the intermittent receiving period is 1.28 seconds, the window W is set to contain 40 chips, and the number of chips to be multiplied is set to be 256. Then, the searching operation, such as the one shown in FIG. 3, is started. Moreover, when the intermittent receiving period is 2.56 seconds, the window W is set to include 50 chips, and the number of chips to be multiplied is set to be 256. When the intermittent receiving period is 5.12 seconds, the window W is set to contain 60 chips, and the number of chips to be multiplied is set to be 256. Further, when the intermittent receiving period is a maximum of 163.84 seconds, the window W is set to include 110 chips, and the number of chips to be multiplied is set to be 128.

In this manner, the area of the window W is increased with a longer intermittent receiving period, thereby making it possible to cope with a greater amount of errors made by the oscillator. The pilot signal timing can thus be reliably detected. Further, the number of chips to be multiplied is 256 when the intermittent receiving period is comparatively short. On the other hand, the number of multiply chip is 128 when the intermittent receiving period is relatively long. With this setting, the time required for expanding the window W with a long intermittent receiving period is offset by a small number of chips to be multiplied. Namely, as discussed above, although a smaller number of chips to be multiplied lowers the timing detection precision, it requires a shorter time for detecting the timing of the pilot signal. Thus, by combining a longer processing time caused by increasing the search area and a shorter processing time caused by decreasing the number of chips to be multiplied, the overall processing time is not significantly increased.

The window W and the number of chips to be multiplied are not restricted to the foregoing values in Table 1, and they may be suitably set in accordance with the precision of the oscillator used in the receiving apparatus or the energy intensity of the pilot signal transmitted from the base station.

Moreover, the timing detection region is changed by varying the area of the window W in this embodiment. However, other factors may be used to change the timing detection region, such as the number of chips to be multiplied or the resolution used in providing the correlation of the PN codes.

The technique of changing the number of chips to be multiplied is as follows. In the foregoing embodiment, the number of chips to be multiplied is set to be 256 or 128 depending on a change in the area of the window W. However, the window W may be fixed, and the number of chips to be multiplied may be changed according to the intermittent receiving period. An increased number of chips to be multiplied reduces the possibility of erroneously detecting the timing, but lengthens the time required for detecting the timing. In contrast, a decreased number of chips to be multiplied shortens the time required for detecting the timing, but increases the possibility of erroneously detecting the timing. Considering the above merits and demerits in light of the circumstances according to the length of the intermittent receiving period, the number of chips to be multiplied is suitably set in response to the intermittent receiving period.

Figure 4A:
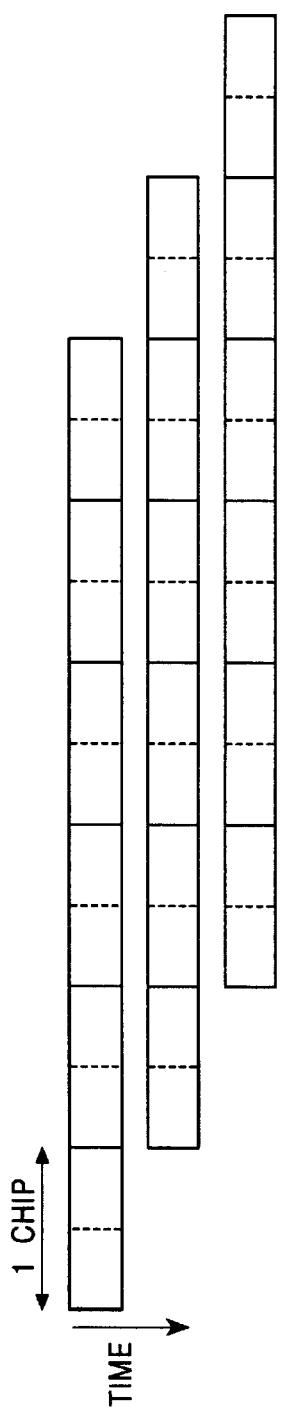
FIGS. 4A, 4B, and 4C, illustrate a variation in the resolution used in providing the PN code correlation by the receiving apparatus shown in FIG. 1.
Figure 4B:
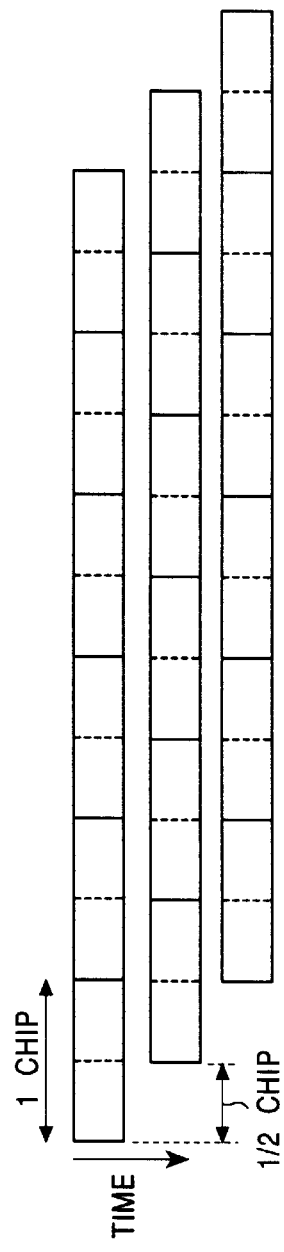
Figure 4C:
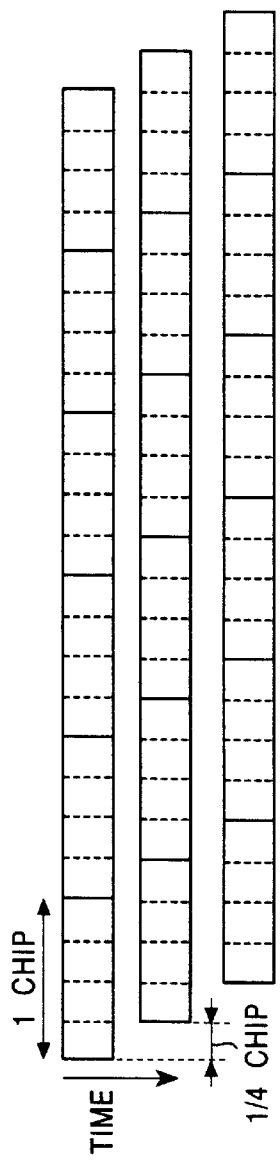

As another approach to changing the timing detection region, the technique of changing the resolution used in providing the correlation of the PN codes is now discussed. In this technique, the amount of shifting of the PN code generation timing is made variable. As discussed above with reference to FIG. 3, the PN code generated in the demodulator is repeatedly correlated with the receiving PN code while the PN code generation timing is being shifted within the search area set as the window W. The amount of shifting in the foregoing embodiment is set to be one chip. FIG. 4A shows the state in which the PN code generation timing is shifted in units of one chip. The amount of shifting may be changed to, for example, a half (½) chip, as illustrated in FIG. 4B, or a quarter (¼) chip, as shown in FIG. 4C. This makes it possible to change the timing detection region.

By elevating the resolution (setting a more precise unit of shifting), the possibility of erroneously-detecting the timing is reduced, and the resolution used in detecting the timing is increased. However, the time required for detecting the timing is increased. Conversely, by lowering the resolution (setting a rougher unit of shifting), the time required for detecting the timing is decreased. On the other hand, the possibility of erroneously detecting the timing is increased, and the resolution used in detecting the timing is lowered. Namely, considering the above advantages and disadvantages, the resolution used in providing the correlation of the PN codes is appropriately set in response to the intermittent receiving operation.

With a wider resolution variable range (setting the maximum resolution to be high), the scale of hardware is disadvantageously enlarged, but the timing detection precision can be changed more flexibly in accordance with the intermittent receiving period.

Although in the foregoing embodiment the IS-95 method is used as an example of the CDMA communication methods, any type of CDMA communication method may be employed in the present invention.

As is seen from the foregoing description, the receiving apparatus of the present invention offers the following advantages. The timing detection region of a spread spectrum signal is set in response to the intermittent receiving period. Accordingly, even if it is difficult to establish synchronization with the base station due to the accumulated errors of the oscillator over a longer intermittent receiving period, the errors of the mobile station can be compensated. Thus, the re-synchronizing operation and the intermittent receiving operation are reliably ensured. This eliminates the need for the provision of an expensive high-precision oscillator, thereby reducing the cost of the receiving apparatus. Power savings are also enhanced because the receiving apparatus can be reliably used even with a longer intermittent receiving period. Further, the timing detection region (the window area) is simply changed to set the timing detection precision, which can be very easily performed by using, for example, software.

What is claimed is:

1. A receiving apparatus for use in a mobile communication system which transmits and receives spread spectrum signals between a base station and a mobile station according to code division multiple access, said receiving apparatus comprising:

timing detecting means for detecting, in resynchronizing with said mobile communication system, a timing of a pilot signal transmitted from the base station by using said pilot signal and spread spectrum signal generated corresponding to said pilot signal;

intermittent receiving means for performing an intermittent receiving operation based on the timing of said pilot signal detected by said timing detection means; and control means for setting, in accordance with an intermittent receiving period set in said intermittent receiving means, a timing detection region of the spread spectrum signal within which the timing of said pilot signal is detected by said timing detection means, wherein said timing detecting means detects the timing of the pilot signal by providing correlation between a received spread spectrum code and a corresponding spread spectrum code generated in said receiving apparatus while the timing at which the spread spectrum code is generated is shifted within a predetermined timing detection region, and wherein said control means sets the timing detection region by changing a resolution used in providing correlation of the spread signal by said timing detection means.

2. The receiving apparatus according to claim 1, wherein said timing detection means detects the timing of said pilot signal by changing a size of a region within which the spread spectrum code is correlated in accordance with the intermittent receiving period set in said intermittent receiving means.

3. The receiving apparatus according to claim 2, wherein a search area of the spread spectrum signal and a correlating region of the spread spectrum code generated in said receiving apparatus are adjusted in accordance with the intermittent receiving period set in said intermittent receiving means.

4. The receiving apparatus according to claim 1, wherein said control means changes the resolution by varying an amount of shifting of the spread spectrum code generated in said receiving apparatus corresponding to the received spread spectrum code.

* * * * *